Aug. 14, 1928.
H. J. BUCKNER
1,680,854
AUTOMOBILE SIGNAL SWITCH
Filed July 2, 1926
2 Sheets-Sheet 1
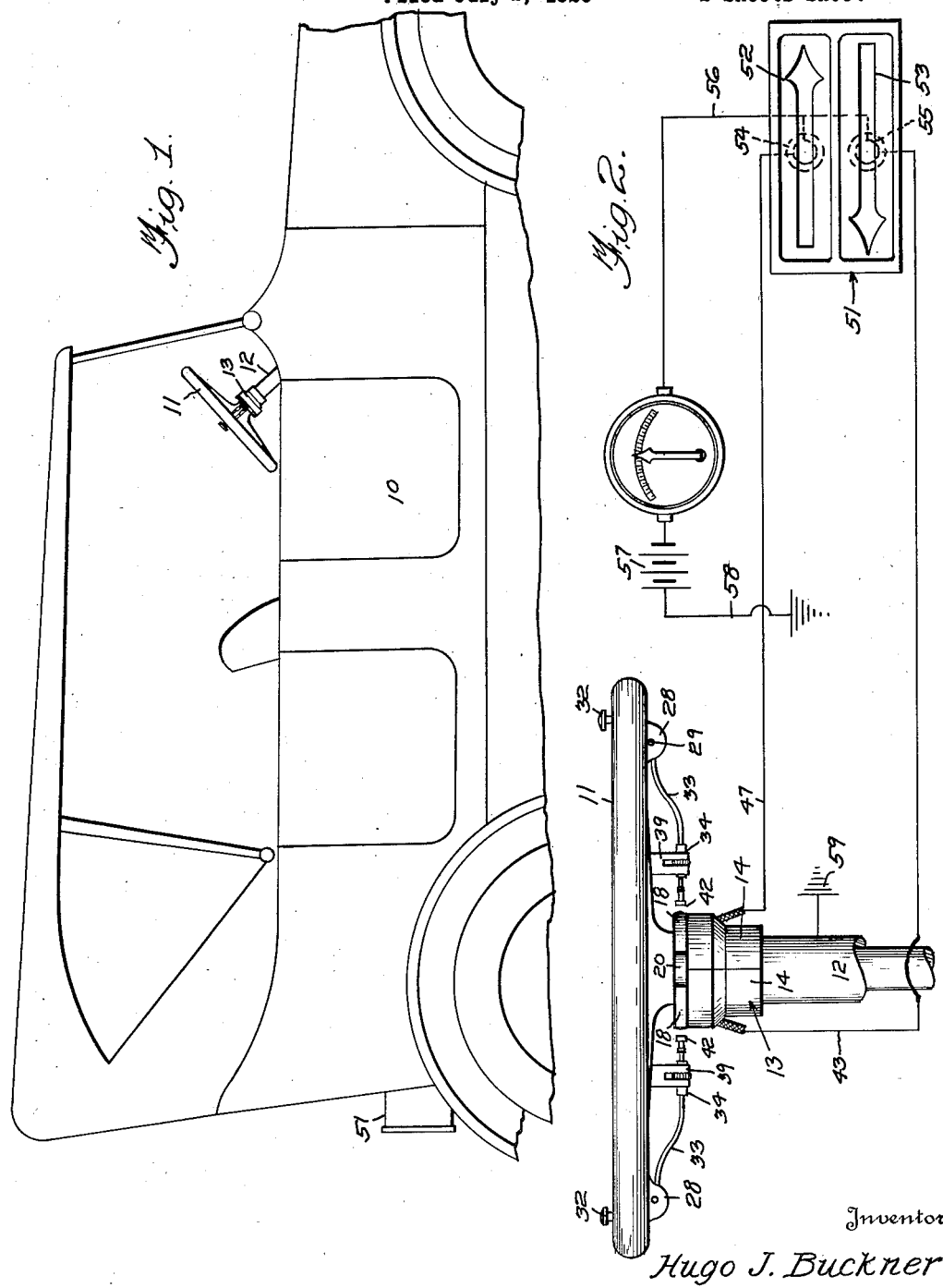
Inventor
Hugo J. Buckner,
By B. P. Fulburn
Attorney Aug. 14, 1928.

H. J. BUCKNER 1,680,854

AUTOMOBILE SIGNAL SWITCH

Filed July 2, 1926  2 Sheets-Sheet 2

Inventor
Hugo J. Buckner,
By B. P. Fulburn
Attorney

Patented Aug. 14, 1928.

1,680,854

UNITED STATES PATENT OFFICE.

HUGO J. BUCKNER, OF HANFORD, CALIFORNIA.

AUTOMOBILE SIGNAL SWITCH.

Application filed July 2, 1926. Serial No. 120,233.

My invention relates to direction indicating signals, for automobiles or like vehicles.

In accordance with my invention, the driver of an automobile or like vehicle, may produce a visual signal, at any suitable time prior to a turning movement of the vehicle, to indicate the direction in which the turn is to be made. When the turn is commenced, partly or wholly completed, the signal device will be automatically actuated and the signal restored to the normal inactive position. The apparatus is of simple construction, and may be actuated instinctively with a little use.

Other objects and advantages of the invention will be apparent during the course of the following description.

In the accompanying drawings forming a part of this specification and in which like numerals are employed to designate like parts throughout the same, Figure 1 is a side elevation of an automobile equipped with direction indicating apparatus embodying my invention.

Figure 3:
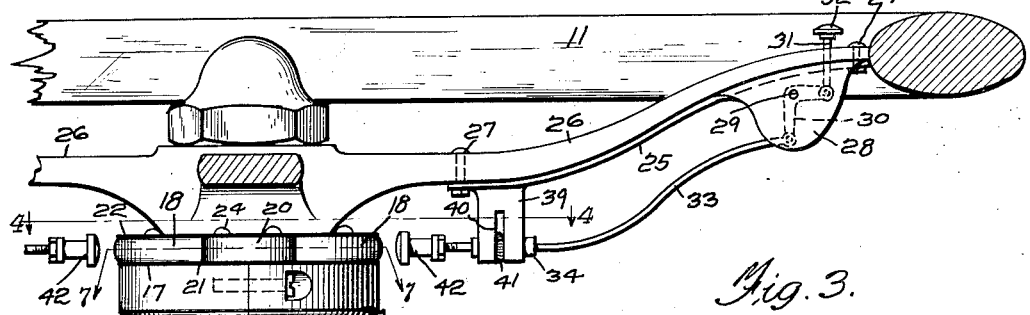
Figure 4:
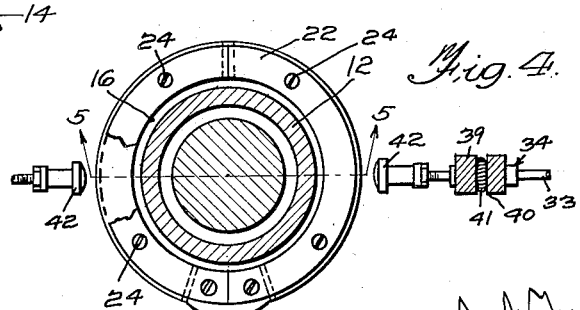
Figures 5, 6:
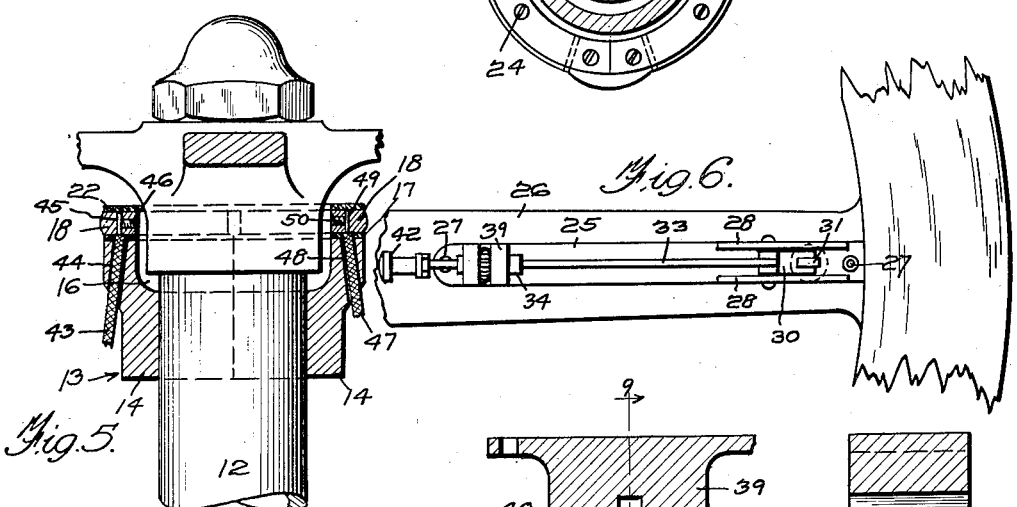
Figures 8, 9:
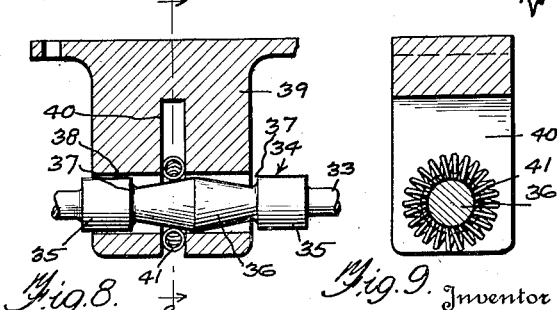
Figure 7:
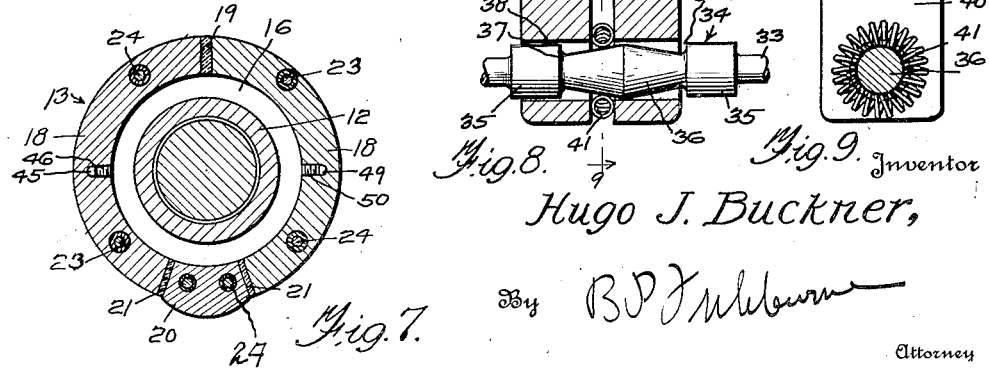

Figure 2 is a side elevation, partly diagrammatic of the apparatus,

Figure 3 is an enlarged side elevation of the steering wheel and associated elements, Figure 4 is a horizontal section taken on line 4—4 of Figure 3, Figure 5 is a vertical section taken on line 5—5 of Figure 4, Figure 6 is a bottom plan view of one of the contact plungers and associated elements, Figure 7 is a horizontal section taken on line 7—7 of Figure 3, Figure 8 is a longitudinal section through one of the locking housings, and Figure 9 is a transverse section taken on line 9—9 of Figure 8.

In the drawings, wherein for the purpose of illustration, is shown a preferred embodiment of my invention, the numeral 10 designates an automobile of any well known or preferred type, embodying a steering wheel 11, and steering column 12, supporting the same, and having electrical connection therewith.

In accordance with my invention, I provide a two-part casing, designated as a whole by the numeral 13. This casing embodies casing sections 14, which are clamped together, and also clamped to the steering column 12 by means of screws 15, or the like. This casing 13 is formed of metal. The upper end of the casing is enlarged and is spaced from the column 12 and from the hub of the steering wheel, providing an annular space or recess 16.

Arranged upon the top of the casing 13 is an insulating ring 17, supporting segmental contacts 18, the forward ends of which are insulated from each other, as shown at 19. Arranged between the rear ends of the segmental contacts 18 is a shifting cam 20, preferably formed of metal, which is insulated from the ends of the contacts 18, as shown at 21. An insulating ring 22 is arranged upon the top of the contacts 18 and shifting cam 20. The contacts 18 are clamped to the top of the casing 13 by means of screws 23, insulated from the same, and the cam 20 is clamped to the casing 13, by screws 24, which are insulated from the cam. It is thus seen that the segmental contacts 18 and the shifting cam 20 are all rigidly mounted upon the top of the casing 13 and thoroughly insulated therefrom. These elements are spaced from the hub of the steering wheel and are hence insulated from the same, or additional insulating means might be arranged between these elements, if desired. As clearly shown in Figure 7, the shifting cam 20 has its face projecting radially beyond the face of the contacts 18.

Disposed upon the left and right sides of the steering column 12 are supporting plates or strips 25, arranged beneath spokes 26 of the steering wheel and rigidly clamped thereto by means of bolts 27, or other suitable means. Each strip or plate 25 is provided near its outer end with a pair of depending knuckles or ears 28, preferably integral therewith, which are apertured for receiving a transverse pin 29, upon which is pivoted a bell-crank lever 30. The outer end of this bell-crank lever is pivotally connected with a vertical rod 31, passing through an opening in the spoke 26, and provided above this spoke with a push button 32. The inner or lower end of this bellcrank lever is pivotally connected with a rod 33, which is provided near its inner end with a guiding and locking element 34, rigidly secured thereto or formed integral therewith, if desired. This guiding or locking element embodies cylindrical ends 35, and a double ended tapered element 36, forming shoulders 37, at its outer ends, with the cylindrical ends 35. These cylindrical ends 35, are slidable within a cylindrical opening 38, formed in a housing 39, depending from the plate 25, and preferably formed integral therewith. Each housing 39 has a transverse vertical opening or slot 40, leading into the opening 38, and a contractable and expansible coil spring 41, is held within the slot 40 and is adapted to engage with the double ended tapered element 36, as shown. The inner end of each rod 33 projects inwardly beyond the housing 39 and is equipped with a contact head or element 42, rigidly secured thereto, and this contact head is adapted to engage with the corresponding segmental contact 18. The plate 25 and elements carried thereby are preferably formed of metal.

An insulated wire 43 passes through an opening 44 in one casing section 14, and passes into a transverse opening 45 in the left contact 18, and may be clamped in this opening by means of a screw 46. An insulated wire 47 passes through an opening 48, in the right casing section 14, and passes through an opening 49 in the right contact segment 18, and is clamped in the opening 49 by means of a screw 50. The numeral 51 designates a visual signal device which may be arranged at any suitable point upon the vehicle, but for the purpose of illustration, I have shown the same applied to the rear end of the automobile. This device embodies an upper signal 52, pointing to the right and a lower signal 53, pointing to the left. These signals are adapted to be illuminated by electric bulbs 54 and 55, respectively. The wire 43 leads to one terminal of the bulb 55 and the wire 47 leads to one terminal of the bulb 54, the opposite terminals of these bulbs being electrically connected with a wire 56, preferably connected with one terminal of an ammeter. The opposite terminal of this ammeter is connected with the inner pole of a battery 57, the opposite pole of which is grounded to the frame work of the vehicle by means of a wire 58. The steering column 12 is grounded to the frame work of the automobile, as shown at 59.

The operation of the apparatus is as follows:

Assuming that the driver intends to turn to the right, and desires to indicate such intention, he depresses the button 32 to the right which shifts the rod 33 inwardly and brings the contact 42 into electrical contact with the segmental contact 18. When this is done, the double ended tapered locking element 36 has its center shifted inwardly beyond the spring 41, and hence the rod 33 is locked in the inner position, and contact 42 will remain in engagement with the contact 18. As soon as the button 32 is depressed to effect this contact, it may be released by the operator. The circuit will now be closed to cause the bulb 54 to glow, and in this circuit, current will pass from one pole of the battery 57 through the wire 56, bulb 54, wire 47, contact 18, contact 42, housing 39, the steering wheel, steering column 12, through the frame work of the car, and back to the opposite pole of the source of current. The circuit remains closed until the turning operation is started, or partly or wholly completed, at which time the turning movement of the steering wheel will bring the contact 42 to the right in engagement with the shifting cam 20, which will cause this contact 42 to be shifted outwardly, and the spring 41 will lock the contact 42 in the outer position. The electrical contact between the contact 42 and the contact 18 is thereby broken and the bulb 54 will cease to glow. It is thus seen that the cam 20 serves to break the circuit and also to return the contact 42 and associated elements to the outer set position, where they are held or locked, until again manually actuated. When it is desired to indicate a left hand turn the button 32 is depressed and a similar operation occurs, and the bulb 55 will glow. This bulb will continue to glow until the steering wheel is turned to the left sufficiently to cause the contact 42, to the left, to engage the shifting cam 20, and to be shifted outwardly thereby. It is thus seen that the operator will instinctively press either the right or left button, depending upon the desired turning movement. Should the operator press the wrong button, he may restore the same to the upper position by pulling it upwardly. The spring 41 and associated elements serve to lock the contact 42 and associated elements in the inner or outer positions.

It is to be understood that the form of my invention, herewith shown and described, is to be taken as a preferred embodiment of my invention, and that various changes in the shape, size and arrangement of parts may be resorted to without departing from the spirit of my invention, or the scope of the subjoined claims.

Having thus described my invention, I claim:—

1. The combination with a steering wheel and stationary steering column casing arranged beneath the same, of a pair of reciprocatory rods mounted upon the steering wheel to travel therewith during the turning of the same, said rods having their outer ends arranged near the rim of the steering wheel and having means whereby they may be shifted longitudinally by the hands of the driver without removing the hands from the steering wheel, said rods having contacts carried by their inner ends, a pair of spaced stationary segmental contacts mounted upon said casing and adapted to be engaged by the adjacent contacts of said rods when said rods are moved inwardly, and an insulated cam arranged between the contact segments and projecting radially therefrom, said cam being so arranged with relation to said rods that it is common to both rods and serves to push them outwardly when they are brought into proximity thereto.

2. The combination with a steering wheel and stationary steering column casing arranged beneath the same, of a pair of reciprocatory rods mounted upon the steering wheel to travel therewith during the turning of the same, said rods being arranged near opposite sides of the wheel, actuating elements carried by the wheel adjacent to its rim and connected with said rods to move them, contact elements carried by the inner ends of said rods and projecting inwardly therebeyond, a pair of spaced stationary segmental contacts mounted upon said casing and arranged inwardly of said contact elements to be engaged thereby when the contact elements are moved inwardly, and a stationary cam arranged between said segmental contacts and projecting radially therebeyond, said cam being common to both contact elements and thereby serving to shift both rods outwardly.

3. The combination with a steering wheel and stationary steering column casing arranged beneath the same, of a pair of reciprocatory rods mounted upon the steering wheel to travel therewith during the turning of the same, said rods being arranged upon opposite sides of the steering wheel, push buttons mounted upon the steering wheel adjacent to its rim and accessible from the top of the steering wheel, connecting means between the push buttons and said rods, rigid contact elements mounted upon the inner ends of said rods, releasable means for holding the rods in the inner and outer positions, stationary contact segments mounted upon said casing inwardly of said rigid contact elements and adapted to be engaged thereby, and a stationary cam arranged between the contact segments and common to both rigid contact elements.

In testimony whereof I affix my signature.

HUGO J. BUCKNER.